United States Patent
Koo

(10) Patent No.: US 9,846,451 B2
(45) Date of Patent: Dec. 19, 2017

(54) PORTABLE DEVICE WITH DETACHABLE HIDDEN HINGE

(71) Applicant: Samsung Electronics Co., Ltd., Suwon-si, Gyeonggi-do (KR)

(72) Inventor: Ja-Goun Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/124,983

(22) PCT Filed: Mar. 24, 2015

(86) PCT No.: PCT/KR2015/002865
§ 371 (c)(1),
(2) Date: Sep. 9, 2016

(87) PCT Pub. No.: WO2015/147519
PCT Pub. Date: Oct. 1, 2015

(65) Prior Publication Data
US 2017/0075381 A1  Mar. 16, 2017

(30) Foreign Application Priority Data

Mar. 27, 2014 (KR) ......................... 10-2014-0035930

(51) Int. Cl.
*G06F 1/16* (2006.01)

(52) U.S. Cl.
CPC .......... *G06F 1/1616* (2013.01); *G06F 1/1654* (2013.01); *G06F 1/1662* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,373,689 | B1 * | 4/2002 | Yim | G06F 1/1616 361/679.27 |
| 6,512,670 | B1 * | 1/2003 | Boehme | G06F 1/1616 312/223.2 |
| 6,530,784 | B1 * | 3/2003 | Yim | G06F 1/1616 361/679.29 |
| 6,700,773 | B1 * | 3/2004 | Adriaansen | G06F 1/1618 345/156 |
| 7,251,128 | B2 * | 7/2007 | Williams | F16M 11/046 248/420 |
| 7,652,873 | B2 * | 1/2010 | Lee | E05B 65/006 248/917 |

(Continued)

FOREIGN PATENT DOCUMENTS

| | | |
|---|---|---|
| CN | 301947821 S | 6/2012 |
| CN | 103148087 A | 6/2013 |

(Continued)

*Primary Examiner* — Lisa Lea Edmonds
(74) *Attorney, Agent, or Firm* — Jefferson IP Law, LLP

(57) ABSTRACT

Disclosed in various examples of the present invention is a configuration in which a hinge part of a portable device can be disposed so as to be hidden. The disclosed portable device comprises: a base part; a display part; and the hinge part, which provides a hinge axis by rotatably connecting the display part to the base part and is separated from the display unit so as to be disposed to be hidden by moving into the inside of the base part.

12 Claims, 14 Drawing Sheets

(56) References Cited

U.S. PATENT DOCUMENTS

| | | | |
|---|---|---|---|
| 8,223,483 B2 * | 7/2012 | Hayashida | G06F 1/1632 361/679.41 |
| 8,413,302 B2 | 4/2013 | Kitagawa et al. | |
| 8,599,542 B1 * | 12/2013 | Healey | G06F 1/1626 345/168 |
| 9,083,778 B2 * | 7/2015 | Kim | G06F 1/1632 |
| 9,194,536 B2 * | 11/2015 | Kim | F16M 13/00 |
| 2006/0274910 A1 * | 12/2006 | Schul | H04R 5/02 381/334 |
| 2009/0040701 A1 * | 2/2009 | Lin | G06F 1/1616 361/679.27 |
| 2012/0083157 A1 | 4/2012 | Abraham | |
| 2012/0194977 A1 * | 8/2012 | Liu | G06F 1/162 361/679.01 |
| 2013/0135809 A1 | 5/2013 | Uchiyama et al. | |
| 2013/0242521 A1 * | 9/2013 | Lin | G06F 1/1624 361/807 |
| 2014/0002963 A1 * | 1/2014 | Mai | G06F 1/1679 361/679.01 |
| 2014/0036423 A1 | 2/2014 | Tanaka | |
| 2014/0133080 A1 * | 5/2014 | Hwang | G06F 1/1632 361/679.17 |
| 2015/0192966 A1 * | 7/2015 | Kim | G06F 1/1681 361/679.28 |
| 2015/0198980 A1 * | 7/2015 | Aoki | G06F 1/1616 361/679.17 |

FOREIGN PATENT DOCUMENTS

| | | |
|---|---|---|
| JP | 2014-029171 A | 2/2014 |
| KR | 10-2006-0020798 A | 3/2006 |
| KR | 10-2010-0065922 A | 6/2010 |
| KR | 10-2013-0060330 A | 6/2013 |
| WO | 2006/129911 A1 | 12/2006 |
| WO | 2011/105637 A1 | 9/2011 |

* cited by examiner

- Prior Art -

- Prior Art -

PORTABLE DEVICE WITH DETACHABLE HIDDEN HINGE

TECHNICAL FIELD

Various exemplary embodiments of the present invention relate to a portable device, for example, to a hinge device.

BACKGROUND ART

A typical portable device refers to a portable electronic device including a notebook personal computer (PC), an attachable and detachable notebook PC from which a display unit is removed, a tablet PC, a smart phone, etc. The portable devices are becoming thinner/slimmer and lighter to enhance the mobility in terms of a form factor (F/F).

In particular, thanks to the development of hardware (HW) technology and related software (SW) (O/S, application) technology of the smart phones and the tablet PCs, the utilization of these products and their importance in the IT product group have gradually increased.

The related-art notebook PCs, desktop PCs, etc. have suggested various F/Fs to compete with these products. A typical example is that a foldable notebook PC suggests a structure of a new form for providing the usage of a tablet PC.

The basic form of the new structure which is able to provide both the usage of the related-art foldable portable device and the usage of the tablet PC provides new usage by suggesting a structure in which a display unit is attachable to or detachable from a main body or a structure in which a display unit swings on a main body.

A basic form of a related-art attachable and detachable notebook PC will be explained with reference to FIGS. 1 and 2. As shown in FIGS. 1 and 2, the related-art portable device includes a main body 10, a display unit 20, and a securing unit 16. The display unit 20 provided with a display screen 22 may be connected to or disconnected from the main body 10 by means of the securing unit 16. In addition, the securing unit 16 includes a hinge unit 15 to fold/unfold the display unit 20 with respect to the main body 10. The display unit 20 has key components disposed therein to perform functions of a processor, a memory, and other PCs. Therefore, when the display unit 20 is disconnected from the main body 10, the display unit 20 is operated to perform the function of the tablet PC.

DETAILED DESCRIPTION OF THE INVENTION

Technical Objects

However, in terms of the form factor of the portable device, for example, the notebook PC, the reliability of the securing unit 16 may become a problem due to the attachable and detachable structure 16, 24 for mounting and dismounting. In addition, easiness of use achieved by attachment and detachment of the main body and the display unit of the attachable and detachable notebook PC, and a securing force/supporting force in a mounting state may be important design factors. In the case of the form factor of the attachable and detachable notebook PC, the shape, size, etc. of the securing unit 16 including the hinge unit 15 are key design factors to determine characteristics to reinforce the securing force/supporting force.

There are points to be considered in a disconnection state, in addition to the structural factor that the attachable and detachable notebook PC should have to have an attachable and detachable structure. For example, the hinge unit 15 disposed in the main body 10 and a connector part disposed in the securing unit 16 may be exposed, and the exposed hinge unit and connector part may cause a problem in view of mobility/storage or an exterior design.

In addition, a space 24 in the display unit 20 for connecting to the main body and a connector may negatively influence the weight and size or exterior design of the portable device.

Therefore, various exemplary embodiments of the present invention provide a portable device which has a display unit attachably and detachably connected with a main body and has a hinge unit disposed to be hidden.

Technical Solving Means

According to various exemplary embodiments of the present disclosure, a portable device includes: a base; a display unit; and a hinge unit which provides a hinge axis by rotatably connecting the display unit to the base, and is disconnected from the display unit and moves into the inside of the base to be disposed to be hidden.

Advantageous Effect

According to various exemplary embodiments of the present invention, a portable device having a good exterior can be used by providing a hinge unit disposed to be hidden, and usage can be enhanced in various user modes.

In addition, according to various exemplary embodiments of the present invention, the mobility, portability, or storage can be enhanced.

BEST MODE FOR EMBODYING THE INVENTION

Figure 1:
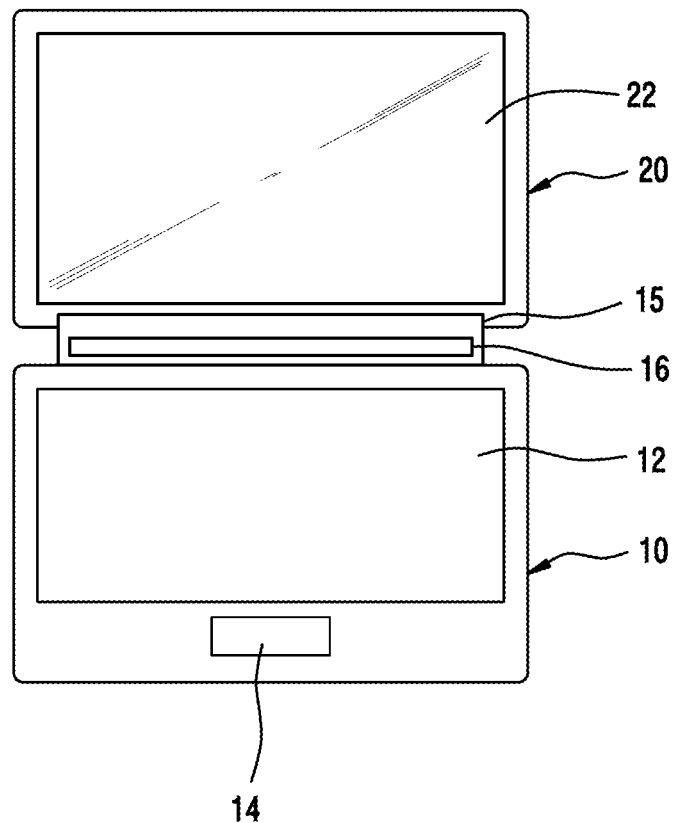
FIG. 1 illustrates a view showing a portable device according to a related-art embodiment.
Figure 2:
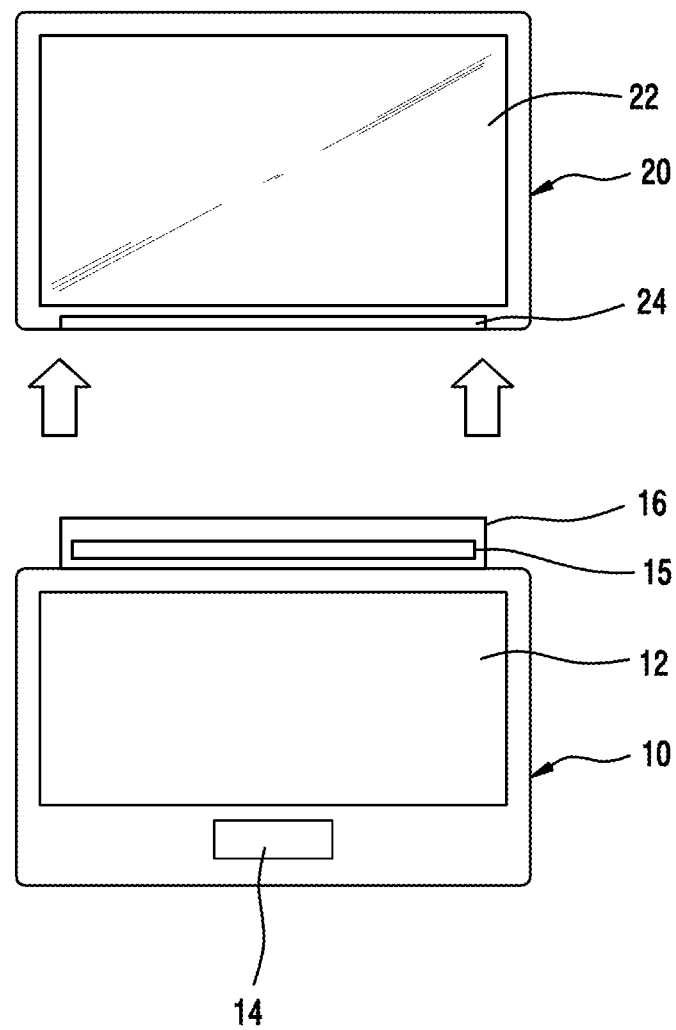
FIG. 2 illustrates a view showing a state in which the display unit of the portable device according to the related-art embodiment is disconnected from the main body.

The present disclosure will be described herein below with reference to the accompanying drawings. Although specific embodiments of the present disclosure are illustrated in the drawings and described in the detailed descriptions, various changes can be made and various embodiments can be provided. However, the present disclosure are not limited to the specific embodiments and should be construed as including all modification and/or equivalent or alternative included in the idea and the technical scope of the present disclosure. In the explanation of the drawings, similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include" or "has" used in the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The term "or" used in the present disclosure includes any and all combinations of words enumerated with it. For example, "A or B" means including A, including B, or including both A and B.

Although the terms such as "first" and "second" used in the present disclosure may modify various elements of the present disclosure, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of the various exemplary embodiments of the present invention, and similarly, a second element may be named a first element.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

The terms used in the various exemplary embodiments of the present disclosure are for the purpose of describing specific exemplary embodiments only and are not intended to limit the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to the present disclosure may be a portable device which includes a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical device, a camera, or a wearable device (for example: a head-mounted-device (HMD) such as electronic glasses, electronic clothing, an electronic bracelet, an electronic necklace, an electronic appccessory, electronic tattoos, or a smartwatch).

According to exemplary embodiments, the electronic device may be a smart home appliance which is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), game consoles, an electronic dictionary, an electronic key, a camcorder, or an electronic album.

According to exemplary embodiments, the electronic device may include at least one of various medical devices (for example: Magnetic Resonance Angiography (MRA), Magnetic Resonance Imaging (MRI), Computed Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example: a navigation equipment for ship, a gyro compass, and the like), avionics, a security device, or an industrial or home robot.

According to exemplary embodiments, the electronic device may include at least one of a part of furniture or a building/a structure equipped with a communication function, an electronic board, an electronic signature receiving device, a projector, and various measurement devices (for example: devices for measuring water, power, gas, radio waves, and the like). The electronic device according to the present disclosure may be one or a combination of one or more of the above-mentioned devices. In addition, it is obvious to an ordinary skilled person in the related art that the electronic device according to the present disclosure is not limited to the above-mentioned devices.

Figure 3:
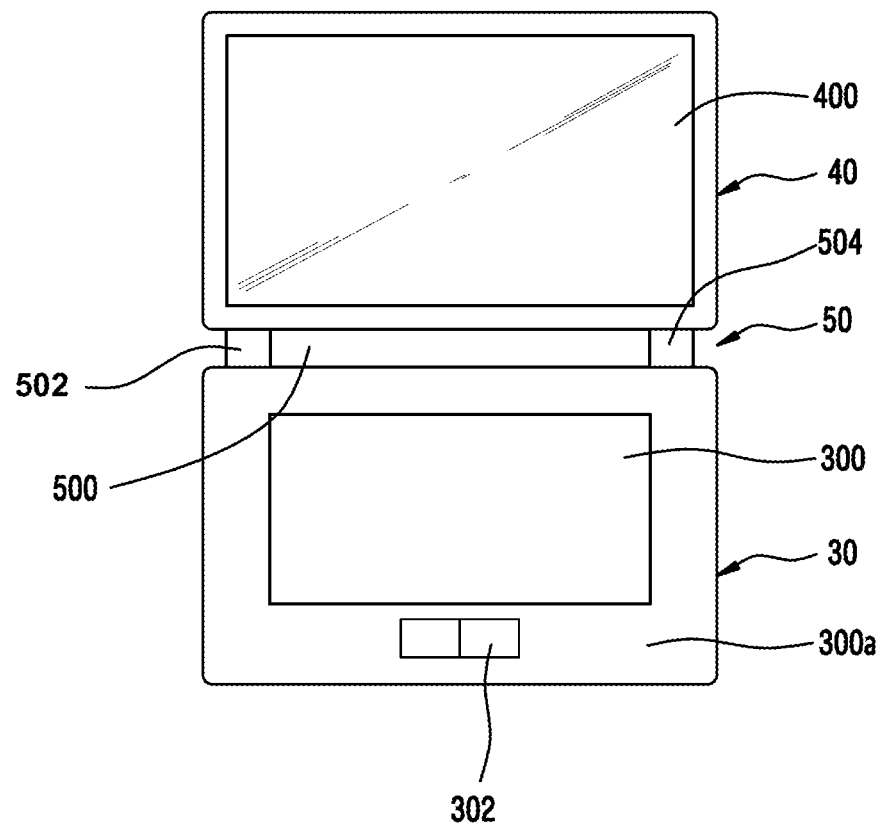
FIG. 3 illustrates a view showing a portable device according to various exemplary embodiments of the present invention.
Figure 4:
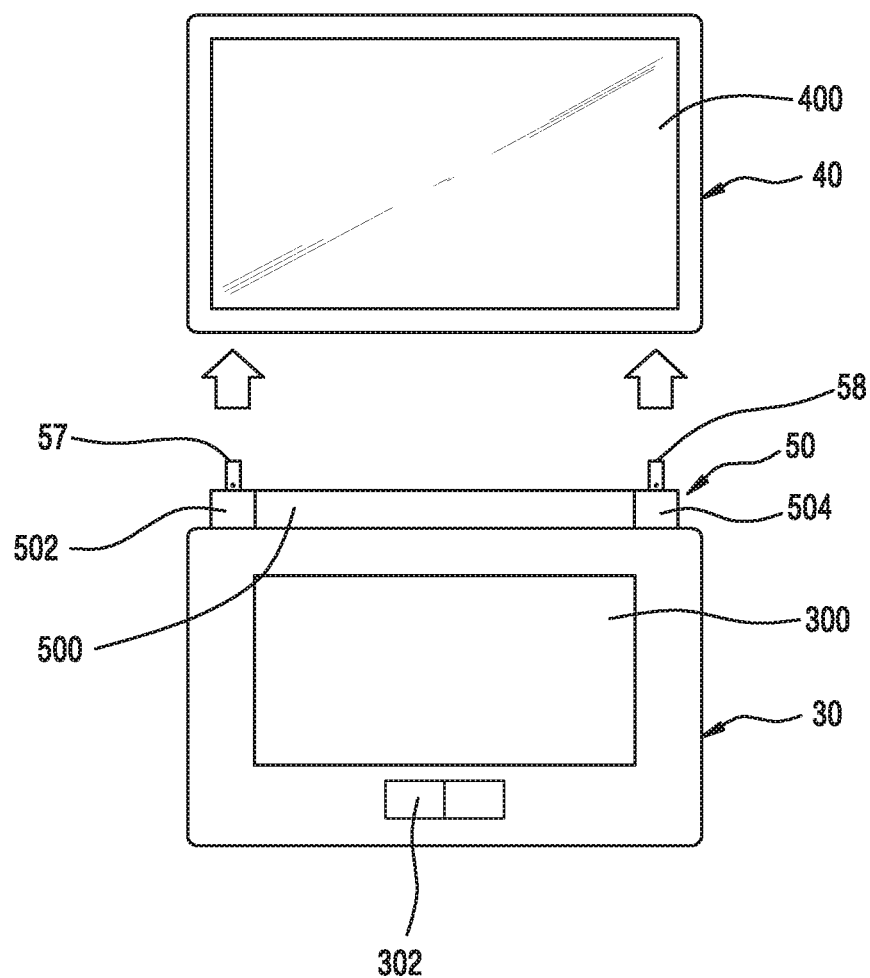
FIG. 4 illustrates a view showing a state in which the display unit of the portable device according to various exemplary embodiments of the present invention is disconnected from the base.

A portable device according to various exemplary embodiments of the present invention will be explained with reference to FIGS. 3 to 9. Referring to FIGS. 3 and 4, the portable device according to an exemplary embodiment of the present invention may include a base 30, a display unit 40, and a hinge unit 50 which is disposed to be hidden. The hinge unit 50 may rotatably connect the display unit 40 to the base 30. In addition, the hinge unit 50 may be attachably or detachably formed on the display unit 40. Accordingly, the display unit 40 may be formed to be connected to or disconnected from the base 30, and an attachable and detachable structure may be formed between the hinge unit 50 and the display unit 40.

When the hinge unit 50 is connected with the display unit 40 (as shown in FIG. 3), the display unit 40 may be folded or unfolded with respect to the base 30. The display unit 40 may be closed when the display unit 40 is folded with respect to the base 30, and may be opened when the display unit 40 is unfolded with respect to the base 30. FIGS. 3 and 4 illustrate a state in which the display unit 40 is opened with respect to the base 30 by about 180 degrees. The base 30 may have a keyboard 300 and a touch pad 302 disposed therein. The display unit 40 may have a display screen 400 disposed therein.

The portable device may include a pair of side hinge arms 502 and 504 disposed between the base 30 and the display unit 40 to enclose the exterior of the hinge unit 50, and a center hinge arm 500 which is disposed between the side hinge arms 502 and 504 and is connected with the side hinge arms 502 and 504. The side hinge arms 502 and 504 and the center hinge arm 500 may serve as a housing forming the exterior of first and second hinge modules, which will be described below, and may be formed to extend in first and second hinge axes directions and enclose the first and second hinge modules. A connector may be disposed in the center hinge arm 500. The connector disposed in the center hinge arm 500 may electrically or mechanically connect the base 30 and the display unit 40. The connector may be electrically connected with the base 30 using a cable or a Flexible Printed Circuit Board (FPCB).

When the display unit 40 is connected to the base 30 by the hinge unit 50 as shown in FIG. 3, the user may provide a use mode (clamshell mode) like a normal notebook PC. When the display unit 40 is disconnected from the base 30 as shown in FIG. 4, the display unit 40 may provide a use mode (table PC mode) to be used as a tablet PC which independently operates. The display unit 40 may be used as a tablet PC.

Figure 5:
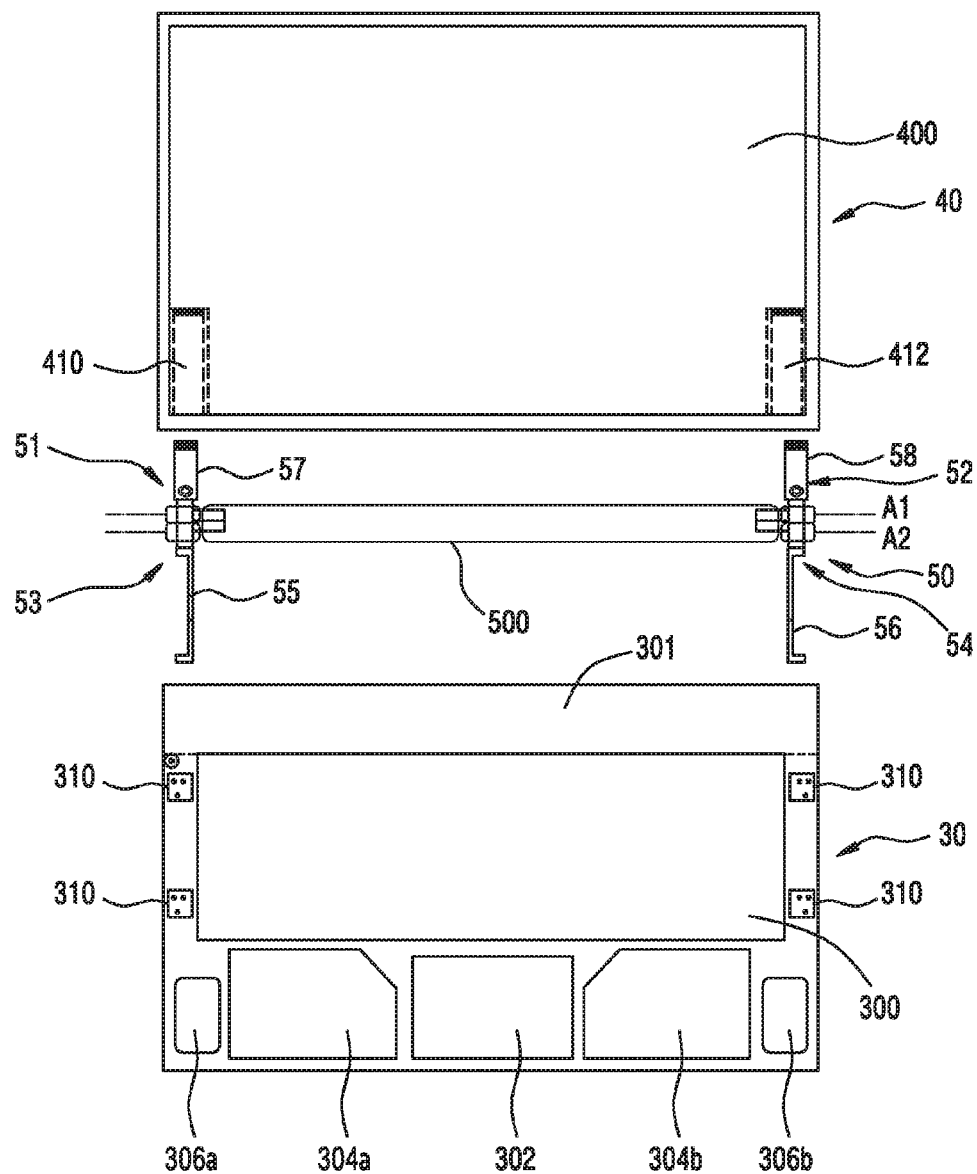
FIG. 5 illustrates a view showing a state in which the display unit and the hinge unit of the portable device according to various exemplary embodiments of the present invention are disconnected from the base.

A structure of a hidden hinge unit 50 according to various exemplary embodiments of the present invention will be explained with reference to FIGS. 5 and 9. As explained above, the display unit 40 may be disconnected from the base 30 as shown in FIG. 5. An attachable and detachable structure may be formed between the hinge unit 50 and the display unit 40. The attachable and detachable structure may include connection members 57 and 58 secured to the hinge unit 50, and mounting parts 410 and 412 provided on the display unit 40. When the connection members 57 and 58 are connected to the mounting parts 410 and 412, the display unit 40 may be connected to the base 30 and may be folded or unfolded. When the connection members 57 and 58 are disconnected from the mounting parts 410 and 412, the display unit 40 may be used as an independent communication device, for example, as a tablet PC.

H/W components accommodated in the base 30 may include a sub board (not shown), a Hard Disk Drive (HDD), a keyboard 300, one or a plurality of auxiliary batteries 304a and 304b, one or a plurality of speakers 306a and 306b, a touch pad, and ports (not shown). Although not shown, a main board, a Central Processing Unit (CPU), a memory, one or a plurality of batteries, one or a plurality of speakers, one or a plurality of cameras, one or a plurality of sensors, and a plurality of ports may be disposed in the display unit 40. Since the display unit 40 may be disconnected from the base 30 and may independently operate as a portable communication device like a tablet PC, the CPU, the keyboard, the memory, and the touch panel may be disposed.

The hinge unit 50 may provide one or a plurality of hinge axes. The hinge axis may include a rotation center axis of a rotating element, and, since the display unit 40 is connected to the base 30 in the present disclosure, the hinge axis may refer to a rotation axis which is provided when the display unit 40 is folded or unfolded. In addition, the hinge unit 50 may include constitutions related to a structure providing a rotation axis, or relevant elements. As described above, the hinge unit 50 may include the pair of side hinge arms 502 and 504 and the center hinge arm 500 forming the exterior.

The hinge unit 50 may include a plurality of hinge modules and may include a first hinge module and a second hinge module which are disposed to be symmetrical (vertically) to each other. The first hinge module may include two hinges 51 and 53, and the hinges 51 and 53 may be disposed to be symmetrical (horizontally) to each other. The second hinge module may include two hinges 52 and 54, and the hinges 52 and 54 may be disposed to be symmetrical (horizontally) to each other. The first hinge module and the second hinge module may be disposed to be symmetrical vertically to each other. The first and second hinge axes A1 and A2 may be disposed to be parallel to each other. The connection members 57 and 58 may be rotatably secured to first parts (securing parts) of the first and second hinge modules, respectively. Guide links 55 and 56 may be provided on second parts (securing parts) of the first and second hinge modules, respectively. The connection members 57 and 58 may be a part of the attachable and detachable structure used to attach and detach the display unit 40, and may be formed of metal pieces. The guide links 55 and 56 may be formed as guide members to be used to move the hinge unit 50 to be hidden in the base 30, and may be formed of metal pieces extending in one direction.

A plurality of stoppers (s) may be symmetrically arranged in the base 30 at intervals along both edges. The stoppers (s) may be symmetrically disposed and may prevent the guide links 55 and 56 provided on the hinge unit from deviating or may limit a sliding movement and a moving distance of the guide links 55 and 56.

Figure 6:
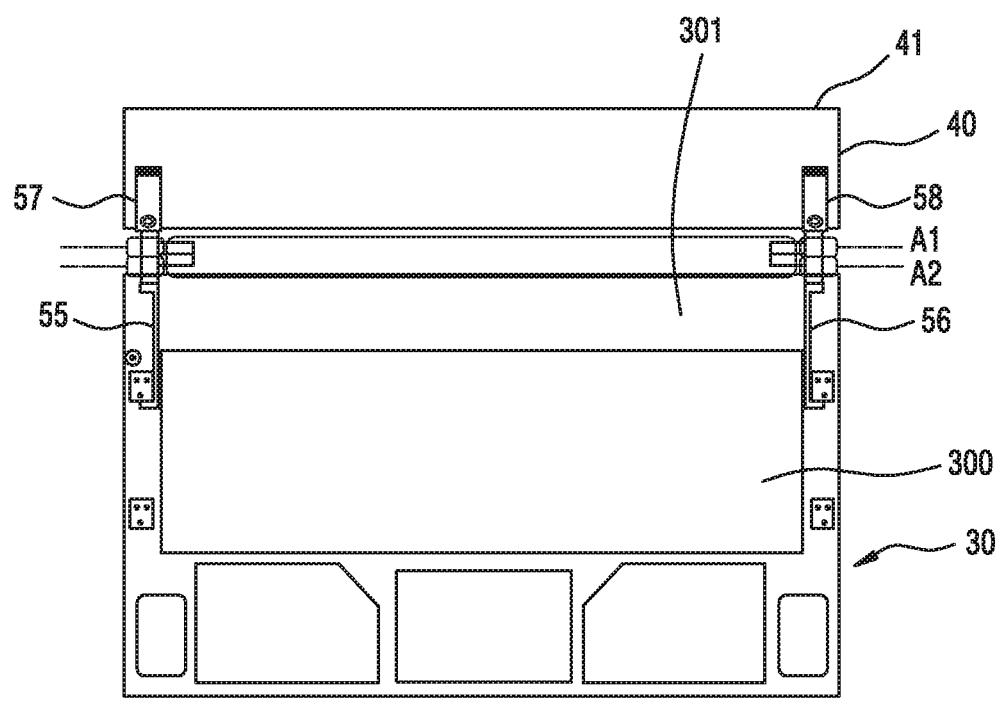
FIG. 6 illustrates a view showing the portable device according to various exemplary embodiments of the present invention, and showing arrangements of HW components.
Figure 7:
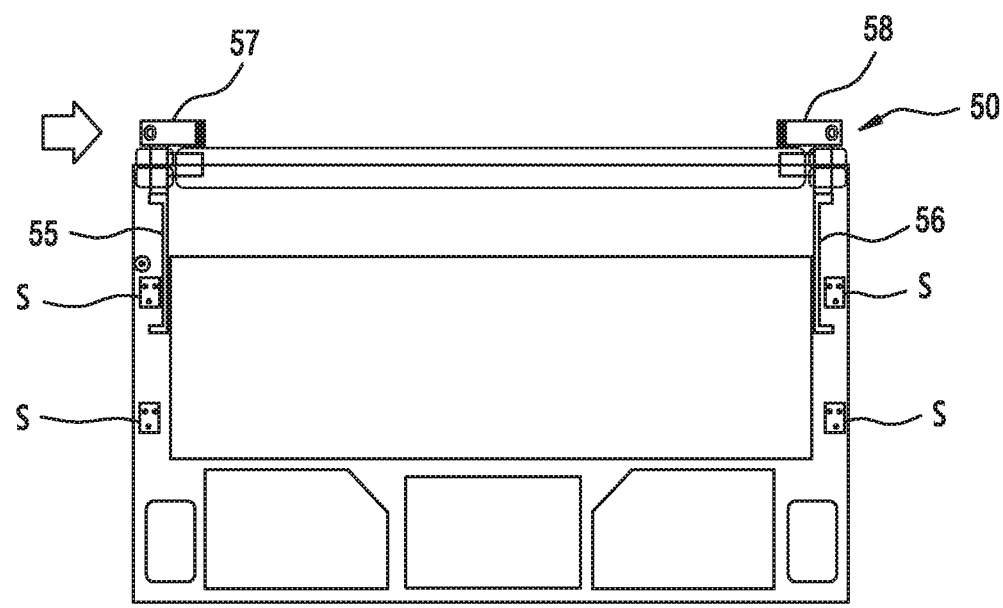
FIG. 7 illustrates a view showing a state in which the display unit of the portable device according to various exemplary embodiments of the present invention is disconnected and thus the connection members of the hinge unit are exposed.
Figure 8:
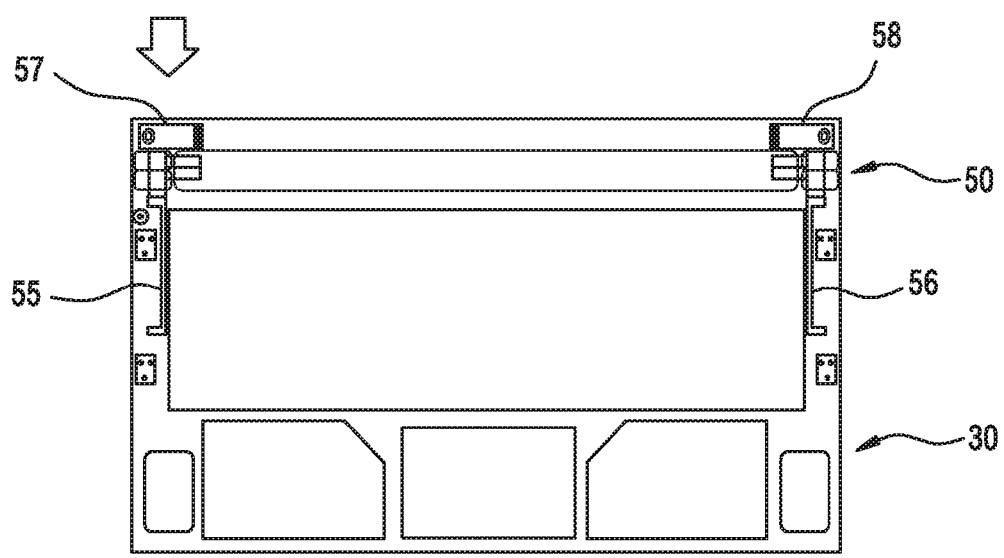
FIG. 8 illustrates a view showing a state in which the hinge unit is hidden in the base of the portable device according to various exemplary embodiments of the present invention.

As shown in FIGS. 6 to 8, the hinge unit 50 according to various exemplary embodiments of the present invention may be formed to be movable and thus may be disposed to be hidden in the base 30. The hinge unit 50 being disposed to be hidden may mean that the hinge unit 50 is disposed not to be seen by the user and the first and second hinge modules and the plurality of hinge arms are disposed to be hidden. The base 30 may provide an accommodation space 301 to hide the hinge unit 50 therein. The accommodation space 301 may be an upper area of the base which is close to the hinge unit 50. In addition, the accommodation space 301 may be limited to a space between the hinge unit 50 and the keyboard 300 in the inner space of the base 30.

FIG. 6 illustrates a state in which the display unit 40 is connected to the base 30 by means of the hinge unit 50. The connection members 57 and 58 of the hinge unit 50 may be connected to the mounting parts 410 and 412 (shown in FIG. 5) provided on the display unit, and the guide links 55 and 56 are in close contact with the stoppers (s) in the base.

FIG. 7 illustrates a state in which the display unit 40 is disconnected from the base 30 and then the hinge unit 50 slides toward the keyboard in the base 30. When the display unit 40 is disconnected from the base 30, the hinge unit 50 being connected with the base 30 may be exposed to the outside. The exterior of the exposed portion of the hinge unit 50 is illustrated in FIG. 4. The exposed portion of the hinge unit 50 may be the pair of side hinge arms 502 and 504 which are always exposed, the center hinge arm 500, and the connection members 57 and 58. The first and second hinge modules forming the hinge unit may be hidden by the side hinge arms 502 and 504 and the center hinge arm 500, and may not be seen. The securing parts of the first and second hinge modules may be disposed on the side hinge arms 502 and 504, respectively, and a shaft portion may be disposed in the center hinge arm 500. Although not shown, the hinge unit 50 and the display unit 40 may be formed to be electrically connected with each other via male and female connectors. In addition, the base 30 and the display unit 40 may transmit and receive signals in a wireless method.

The connection members 57 and 58 may be formed to rotate in order to reduce a moving distance of the hinge unit 50 into the inside of the base since the connection members 57 and 58 are the highest protruding portions when the base 30 and the display unit 40 are disconnected from each other. FIG. 7 illustrates a state in which the connection members 57 and 58 are rotated by about 90 degrees.

As shown in FIG. 8, the hinge unit 50 may be completely accommodated in the base. When the connection members 57 and 58 are rotated by 90 degrees and are continuously pushed, the hinge unit 50 may be disposed to be completely hidden in the base 30. The sliding movement of the hinge unit 50 is achieved in parallel by the guide links 55 and 56 in the base 30. To achieve the smooth sliding movement of the hinge unit 50, a separate guide structure may be formed in the base. The final position of the hinge unit 50 after the sliding movement is in the accommodation space 301 and may be safely maintained.

Figure 9:
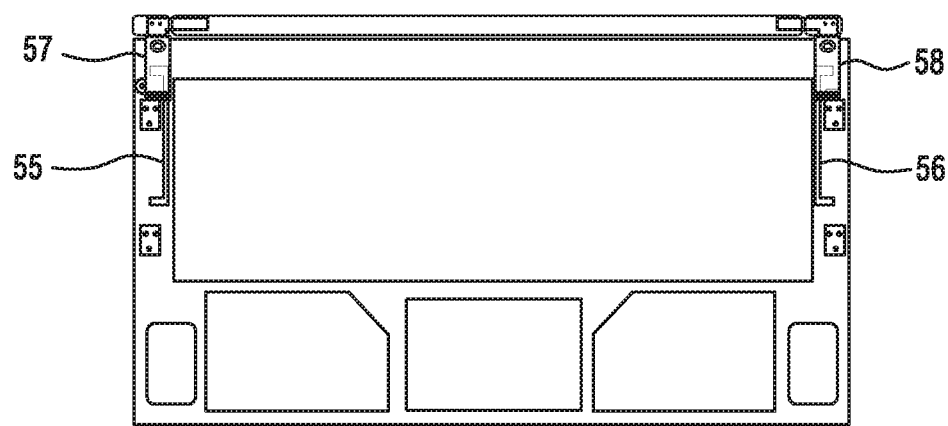
FIG. 9 illustrates a view showing a folding state of the portable device according to various exemplary embodiments of the present invention.

FIG. 9 illustrates a view showing a state in which the portable device according to various exemplary embodiments of the present invention is closed. When the display unit 40 is folded with respect to the base 30, the hinge unit 50 may be disposed in an upright state of about 90 degrees.

Figure 10:
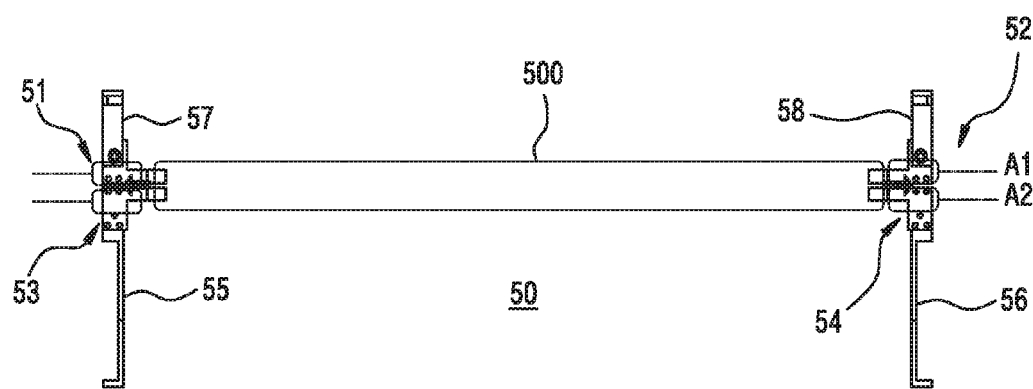
FIG. 10 illustrates a view showing the configuration of the hinge unit employed in the portable device according to various exemplary embodiments of the present invention.
Figure 11A:
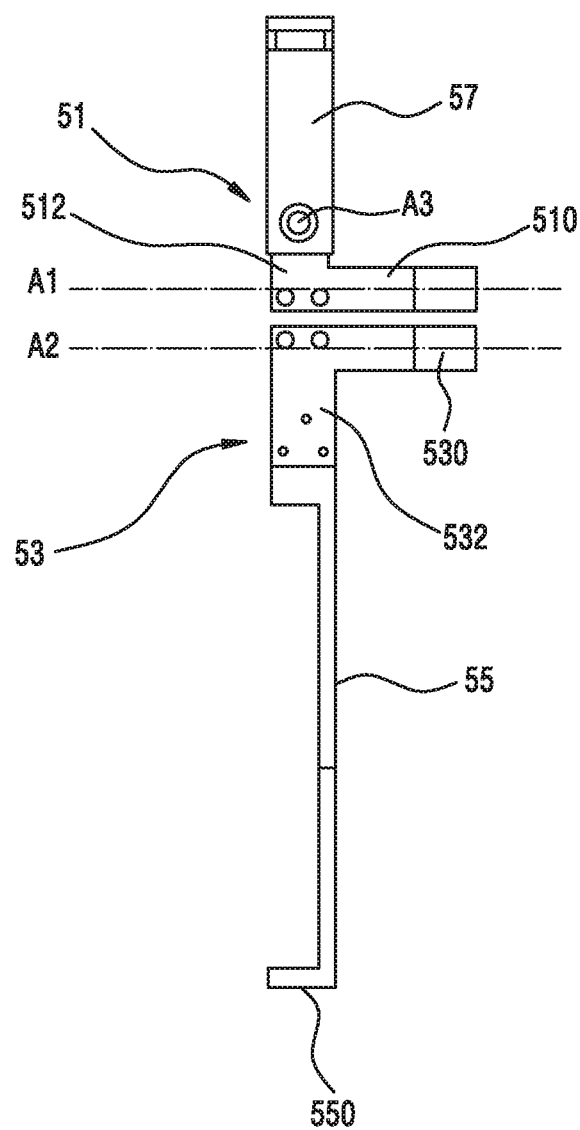
FIGS. 11A and 11B illustrate views showing hinge modules forming the hinge unit according to various exemplary embodiments of the present invention.
Figure 11B:
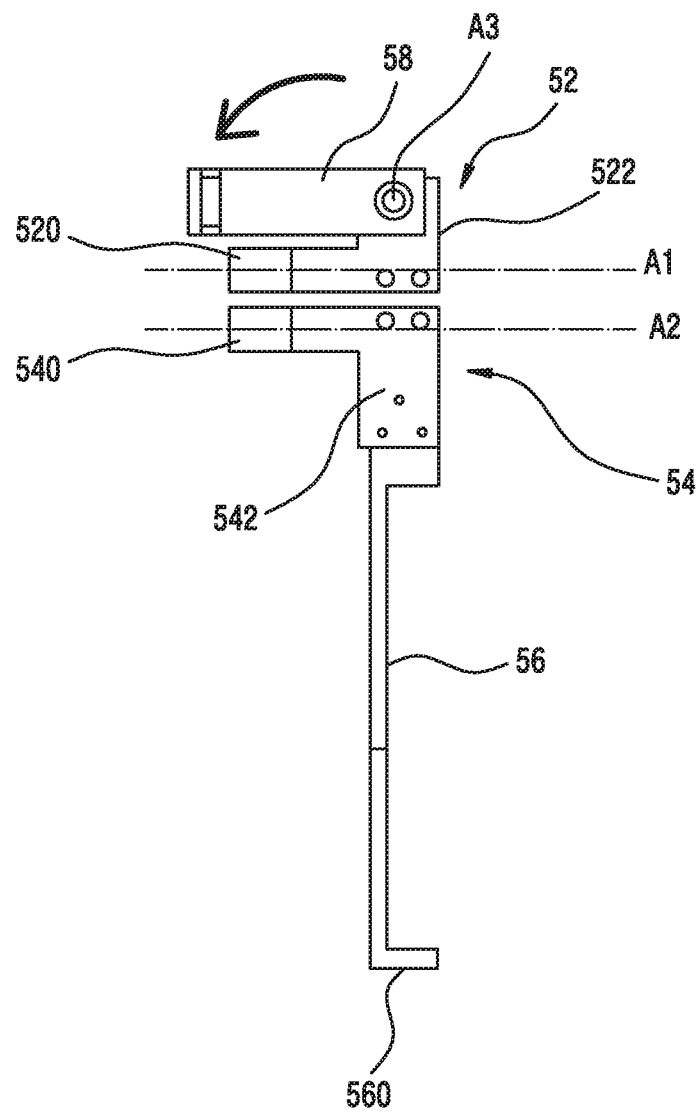

The configuration of the hinge unit 50 according to various exemplary embodiments of the present disclosure will be explained with reference to FIGS. 10 to 11B. The hinge unit may include a first hinge module (two hinges 51 and 53) and a second hinge module (two hinges 52 and 54). The first hinge module may include two hinges 51 and 53, and the hinges 51 and 53 may include shaft parts 510 and 530 and securing parts 512 and 532, respectively. The shift parts 510 and 530 may be connected with the center hinge arm and provide the first and second hinge axes A1 and A2, respectively. The connection member 57 may be rotatably secured to the securing part 512, and the guide link 55 may be fixed to the securing part 532. The securing parts 512 and 532 may extend from the shaft parts 520 and 540, respectively, in a perpendicular direction. The second hinge module may include two hinges 52 and 54, and the hinges 52 and 54 may include shaft parts 520 and 540 and securing parts 522 and 542, respectively. The shaft parts 520 and 540 may be connected with the center hinge arm, and may provide the first and second hinge axes A1 and A2. The connection member 58 may be rotatably secured to the securing part 522 and the guide link 56 may be fixed to the securing part 542. The securing parts 522 and 542 may extend from the shaft parts 520 and 540, respectively, in a perpendicular direction.

The connection members 57 and 58 which are rotatably formed at the securing parts of the hinge unit 50 may have a rotation angle of about 90 to 270 degrees. However, the connection members may be secured to be rotatable by 0 to 360 degrees. FIG. 11B illustrates a state in which the connection member 58 is rotated by about 90 degrees (in a counter clockwise direction). However, the connection member 58 may be rotated by about 270 degrees (in a clockwise direction). Third and fourth hinge axes A3 and A4 of the connection members 57 and 58 are parallel to each other, and are disposed at distances from the first and second hinge axes A1 and A2 to be perpendicular to the first and second hinge axes A1 and A1.

The guide links 55 and 56 are members which extend in one direction and are made of metallic material, and have their ends 550 and 560 bent so as to prevent the hinge unit 50 from deviating or limit an excessive movement of the hinge unit 50.

The hinges 51 and 53 forming the first hinge module of the hinge unit 50 may be formed to be engaged with each other, and the hinges 52 and 54 forming the second hinge module may be formed to be engaged with each other. When the hinges 51 and 53 forming the first hinge module are formed to be engaged with each other, the hinges 51 and 53 of the first hinge module may be formed as damping gear type hinge modules, and, when the hinges 52 and 54 forming the second hinge module are formed to be engaged with each other, the hinges 52 and 54 may be formed as damping gear type hinge modules.

Figure 12:
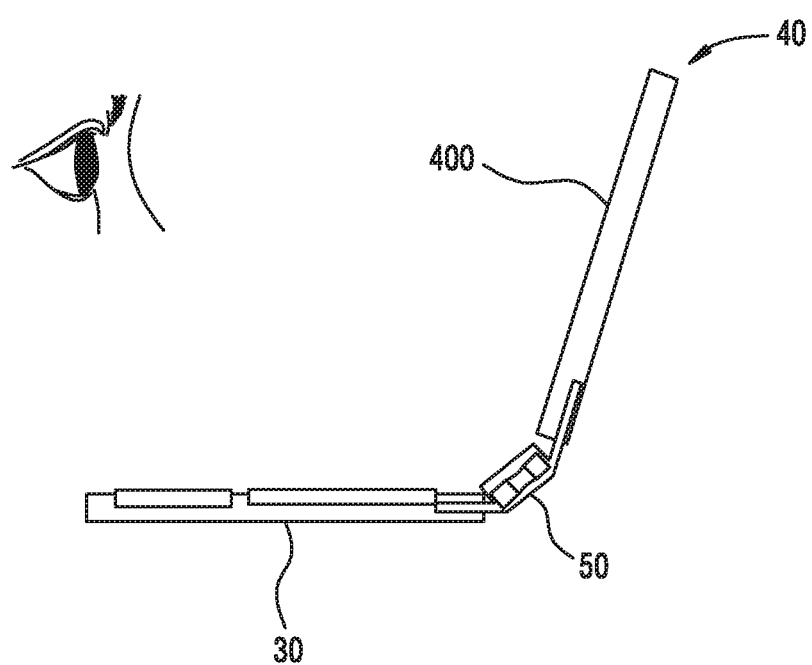
FIG. 12 illustrates a use state view showing a first user mode of the portable device according to various exemplary embodiments of the present invention.
Figure 13:
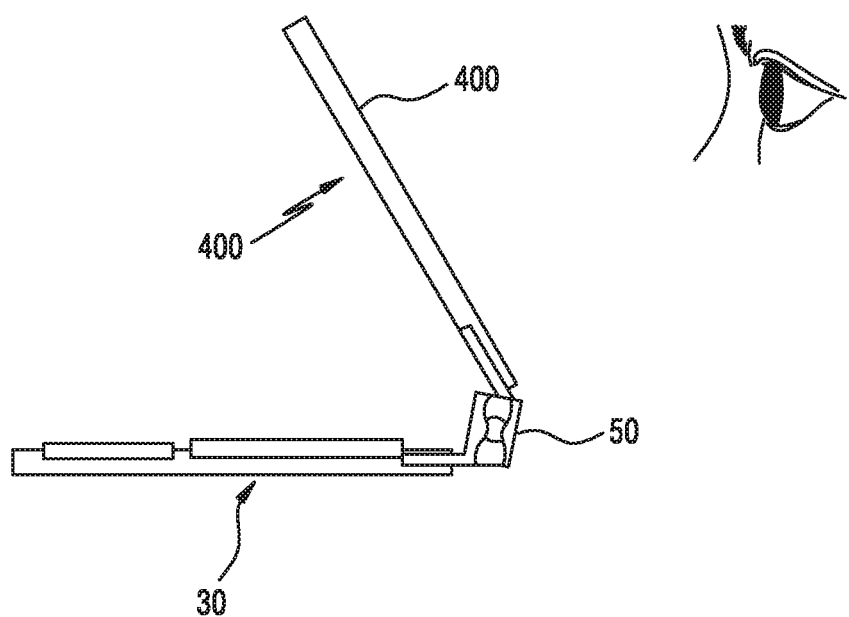
FIG. 13 illustrates a use state view showing a second user mode of the portable device according to various exemplary embodiments of the present invention.

FIGS. 12 and 13 illustrate views showing examples of user using modes of the portable device according to various exemplary embodiments of the present invention. As shown in FIG. 12, when the display unit 40 is opened on the base 30 by about 120 degrees, the user may use the portable device in a first user mode (clamshell mode). The stop of the display unit is provided by the hinge unit. In addition, since most of the heavy components from among HW components mounted in the portable device are arranged in the base, the above-described operation is possible. The heavy HW components may be a battery (shown in FIG. 5).

When the display unit 40 is disconnected from the base 30, is turned back to front, and then is reconnected to the base 30 as shown in FIG. 13, the display unit 40 may be disposed on the outer surface of the display screen 400, and may be used in a second user mode (flipable mode). Since the connection members 57 and 58 have the same configuration and are disposed to be symmetrical to each other, and the mounting parts 410 and 412 (shown in FIG. 5) into which the connection members are inserted have the same configuration and are disposed to be symmetrical to each other, the display unit 40 may be turned back to front and may be reconnected to the base 30.

The various exemplary embodiments of the present invention do not limit the hinge unit to the structure which is disposed to be hidden in the base, and the hinge unit may be disposed to be hidden in the display unit.

According to various exemplary embodiments of the present disclosure, at least part of the apparatus (for example: modules or functions) or method (for example: operations) according to the present disclosure may be implemented by using instructions stored in computer-readable storage media in the form of a programming module. When the instructions are executed by one or more processors, the one or more processors may perform a function corresponding to the instructions. The computer-readable storage media may be the memory, for example. At least part of the programming module may be implemented (for example: executed) by using the processor. At least part of the programming module may include a module, a program, a routine, sets of instructions, a process, and the like for performing one or more functions.

Examples of the computer-readable recording media include magnetic media such as hard disks, floppy disks and magnetic tapes, optical media such as a Compact Disc Read Only Memory (CD-ROM) and a Digital Versatile Disc (DVD), magneto-optical media such as floptical disks, and hardware devices such as a Read Only Memory (ROM), a Random Access Memory (RAM) and a flash memory that are especially configured to store and execute program commands (for example; the programming module). Examples of the program commands include machine language codes created by a compiler, and high-level language codes that can be executed by a computer by using an interpreter. The above-described hardware devices may be configured to operate as one or more software modules for performing operations of the present disclosure, and vice versa.

A module or programming module according to the present disclosure may include one or more of the above-described elements, may omit some elements, or may further include additional elements. The operations performed by the module, the programming module, or the other elements according to the present disclosure may be performed serially, in parallel, repeatedly, or heuristically. In addition, some operations may be performed in different order or may be omitted, and an additional operation may be added.

The various exemplary embodiments of the present disclosure disclosed in the present specification and drawings are merely specific embodiments to easily explain the technical features and assist easy understanding, and are not intended to limit the scope of the various exemplary embodiments of the present disclosure. Therefore, the scope of the various exemplary embodiments of the present disclosure should be interpreted as including all changes or changed forms derived based on the technical idea of the various exemplary embodiments of the present disclosure, in addition to the exemplary embodiments disclosed herein.

What is claimed is:

1. A portable device comprising:
   a base;
   a display unit; and
   a hinge unit which provides a hinge axis by rotatably connecting the display unit to the base, and is disconnected from the display unit and moves into the inside of the base to be disposed to be hidden,
   wherein the hinge unit comprises:
      a hinge module which provides the hinge axis, and at least one connection member which is rotatably secured to a first part of the hinge module and is attached to and detached from the display unit, and
   wherein the portable device further comprises at least one guide link which is disposed in the base while being connected to a second part of the hinge module facing the first part of the hinge module, and guides a parallel sliding movement of the hinge unit into the base.

2. The portable device of claim 1, wherein the connection member is rotated to be disposed to be hidden in the base.

3. A portable device comprising:
   a base in which a keyboard is disposed;
   a display unit; and
   a hinge unit which provides a folding/unfolding operation by connecting the
   display unit to the base to be rotatable about first and second hinge axes, and slides into the base and is disposed to be hidden,
   wherein the hinge unit moves toward the keyboard in parallel in the base and is hidden.

4. The portable device of claim 3, wherein the hinge unit comprises:
   a first hinge module which comprises two hinges (51 and 53);
   a second hinge module which comprises two hinges (52 and 54), provides the first and second hinge axes with the first hinge module, and is disposed to be symmetrical to the first hinge module; and
   a plurality of hinge arms which enclose the first and second hinge modules.

5. The portable device of claim 4,
   wherein an attachable and detachable structure is disposed between the hinge unit and the display unit, and
   wherein the attachable and detachable structure is symmetrical vertically, and comprises:
      first and second connection members which are rotatably secured to first parts of the hinges (51 and 52); and
      first and second mounting parts which are formed at both corners of the display unit, and to or from which the first and second connection members are connected or disconnected.

6. The portable device of claim 5, wherein the first and second connection members are rotated by 0 to 360 degrees.

7. The portable device of claim 6, wherein third and fourth hinge axes of the first and second connection members are parallel to each other, and are disposed at distances from the first and second hinge axes to be perpendicular to the first and second hinge axes.

8. The portable device of claim 4, further comprising:
   first and second guide links which face each other,
   wherein the first and second guide links are mounted on the hinges (53 and 54).

9. The portable device of claim 8, wherein the base comprises a plurality of stoppers formed therein symmetrically at intervals to limit sliding movement of the first and second guide links.

10. The portable device of claim 4, wherein the hinges (51, 52, 53, and 54) are configured as damping gear type hinges, and the hinges (51 and 52) are disposed to be engaged with each other and the hinges (53 and 54) are disposed to be engaged with each other.

11. A portable device comprising:
   a first body;
   a second body; and
   a third body which is folded or unfolded with respect to the first body by the second body,
   wherein the second body is disconnected from the third body and moves into the inside of the first body to be disposed to be hidden,
   wherein the second body comprises a hinge module which provides a hinge axis, and at least one connection member which is rotatably secured to a first part of the hinge module and is attached to and detached from the second body, and
   wherein the portable device further comprises at least one guide link which is disposed in the first body while being connected to a second part of the hinge module facing the first part of the hinge module, and guides a parallel sliding movement of the second body into the first body.

12. The portable device of claim 11,
   wherein the first body comprises a keyboard, and wherein the third body comprises a display.

* * * * *